Oct. 8, 1968  C. I. BOKSJÖ  3,405,343
HIGH VOLTAGE STATIC CONVERTER WITH SEMI-CONDUCTING RECTIFIERS
Filed June 8, 1966

INVENTOR.
CARL INGVAR BOKSJÖ
BY
Bailey, Stephens & Huettig
ATTORNEYS

United States Patent Office 3,405,343
Patented Oct. 8, 1968

3,405,343
HIGH VOLTAGE STATIC CONVERTER WITH SEMICONDUCTING RECTIFIERS
Carl Ingvar Boksjö, Ludvika, Sweden, assignor to Allmänna Svenska Elektriska Aktiebolaget, Vasteras, Sweden, a Swedish corporation
Filed June 8, 1966, Ser. No. 556,007
Claims priority, application Sweden, June 8, 1965, 7,449/65
4 Claims. (Cl. 321—5)

ABSTRACT OF THE DISCLOSURE

A static converter for inverter or rectifier operation having an input side and an output side, one of said sides being an A.C. side, the other being a D.C. side. Said converter comprises a set of main rectifier branches and a set of auxiliary branches reverse-parallel connected thereto. Said auxiliary branches are in general equal to said main branches and form an over-voltage protection therefor.

---

Figure 1:
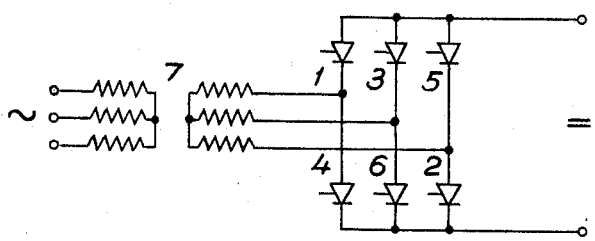

The present invention relates to a static converter for high voltage provided with semi-conducting metal rectifiers.

Static converters for high voltage have up to now only been made with mercury arc rectifiers but it has been suggested recently to use controlled metal rectifiers, so-called thyristors, which in static converters for low voltages have proved to be advantageous. In order to obtain sufficient security against high inverse and block voltage a large number of metal rectifiers must be connected in series in every converter branch while at the same time each such branch must be connected in parallel with a suitable voltage divider in order to obtain a good distribution of the voltage along the chain of rectifiers. The number of series-connected rectifiers is, however, not only dependent on the inverse and block voltage but is more dependent on the magnitude of possible overvoltages which are more dangerous to metal rectifiers than to the mercury arc rectifiers used hitherto. Besides the fact that the large number of rectifiers in itself involves an expense, this large number of rectifiers involves in addition great losses in the conducting direction in every converter branch.

A static converter according to the present invention is characterised in that every rectifier branch in the static converter comprises two reverse-parallel connected branches, each comprising a number of series-connected rectifiers. At first sight such a shape of the static converter seems to imply a doubling of the number of rectifiers in the static converter. This is, however, not the case, as it is possible to use one of the two reverse-parallel connected branches as an over-voltage protection means for the other. In this way the protection level, that is the maximum estimated overvoltage which the rectifiers are to withstand, is reduced considerably.

In the case in question it had been estimated that at a D.C. voltage of 133 kv. over a rectifier group with the pulse number six, every branch should be dimensioned for a protection level of 500 kv. With two reverse-parallel connected branches it is, however, possible to reduce the protection level to twice the voltage amplitude, which is approximately 140 kv. on every rectifier branch, in other words a protection level of 280 kv. for every rectifier branch. This means that in every rectifier branch only about half the number of rectifiers compared to that required previously is needed so that the total number of rectifiers is only increased about 10%. At the same time, however, the losses in the connection will be reduced to approximately half, due to the lower number of series-connected rectifiers, and therefore the total amount of rectifier costs and costs due to losses will be reduced compared to simple series-connection.

In addition to the reduction in rectifier costs the connection according to the invention means, however, also other savings and advantages. Thus the two reverse-parallel connected rectifier branches can be means of traverse connections be connected to a common voltage divider which can also be simplified because of the reduced number of series-connected rectifiers.

Due to the fact that the different rectifiers in a chain work with different potential, separate feeding units for each rectifier must be arranged for transferring control pulses to the rectifiers. In a connection according to the invention pairs of the rectifiers in two reverse-parallel connected branches will have the same cathode potential, and therefore it is further suggested according to the invention to provide such pairs of rectifiers with common feeding means for the control pulses. In this way also the number of feeding units will be reduced compared to the connection previously suggested.

A further advantage of the invention appears with a complete D.C. transmission according to the invention comprising at least two converter stations. Upon a change in the power direction between two such stations two possibilities existed hitherto.

One possibility consists of keeping constant direction of current in the transmission lines, whereby a change in the power direction means a change in the polarity in the transmission lines, which in cable transmissions means that the cable insulation must withstand a recharge of the cable which means a considerable increase in the costs of the cable insulation. Furthermore the recharge of the cable takes a certain determined time. The other possibility consists of a shifting of the polarity of the static converters, whereby these must be blocked and switched from one polarity to another, which takes time and further the converters must be provided with switching devices in the main circuit for such a switching of the polarity. At a cooperation between two networks of equal magnitude which are connected with a D.C. transmission, for example for equalizing load variations during the twenty-four hour period, the many power reversals during twenty-four hours are a disadvantage with both the possibilities mentioned above. In transmissions between more than two converter stations the polarity of the transmission lines is usually fixed and therefore at a changeover from rectifier operation to inverter operation or vice versa in a converter station the polarity of the station must always be switched, that is according to the second possibility.

A static converter according to the invention makes a rapid change of the polarity of the static converter possible by transferring from one of the reverse-parallel connected rectifier chains to the other, whereby the disadvantages previously known in power reversing completely disappear.

Figure 2:
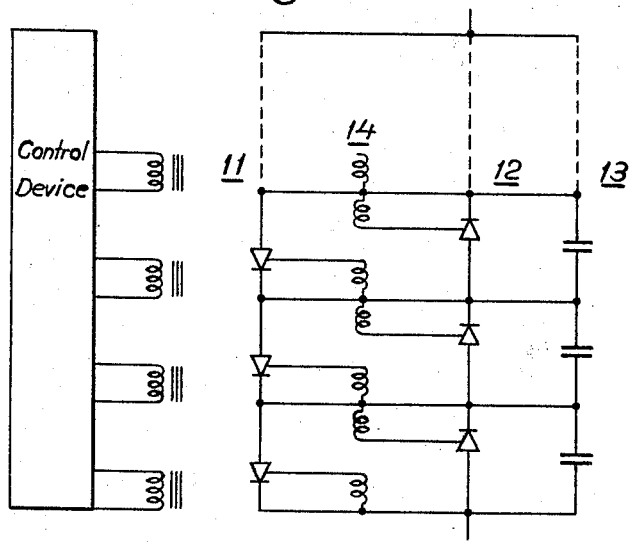
Figure 3:
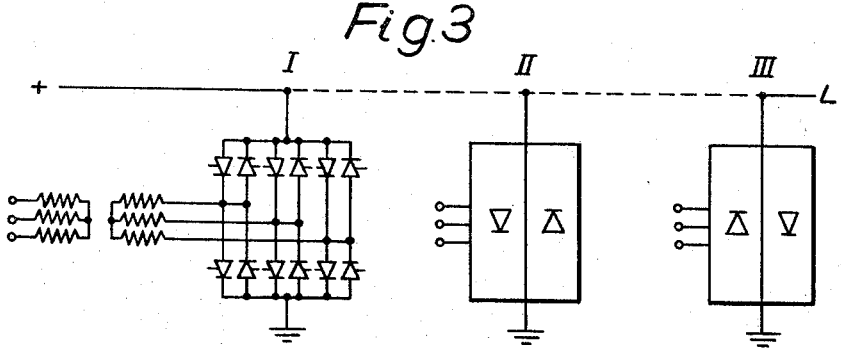

The invention will further be described more fully with reference to the enclosed drawing, where FIGURE 1 schematically shows a static converter, while FIGURE 2 shows a rectifier-connection or branch according to the invention. FIGURE 3 shows a D.C. transmission between a number of converter stations built up according to the invention.

FIGURE 1 shows a static converter which connects an A.C. network and a D.C. network and which consists of a bridge connection comprising six rectifier branches 1–6 as well as a converter transformer 7. In FIGURE 1 only one thyristor is shown in each rectifier branch but in fact each branch comprises a number of series-connected thyristors corresponding to the desired voltage of the converter. In FIGURE 2 it is shown how each rectifier branch of FIGURE 1 according to the invention is built up of two reverse-parallel connected chains 11 and 12, each comprising a number of series-connected controlled metal rectifier thyristors. The two rectifier chains are by means of transverse connections connected to a common voltage divider 13 which has been shown here as a purely capacitive voltage divider but which is more often made as a resistive, capacitive voltage divider with series connected capacitors and resistors.

From FIGURE 2 it can further be seen that corresponding pairs of the rectifiers in the two chains 11 and 12 will have the same cathode potential mutually connected with a transverse connection to the voltage divider 13. The control circuits for such two rectifiers will therefore have the same potential, and the control circuits for each such pair should therefore suitably be provided with a common feeding unit, for example a control pulse transformer with secondary windings 14. The primary sides of said control pulse transformers are fed from a common control device giving control pulses of suitable length and phase position. At one of the ends of every rectifier chain there will, as seen, be a rectifier which has nothing corresponding to it in the other rectifier chain, and therefore with $n$ series-connected rectifiers in every chain the number of feeding units will be $n+1$. With only one rectifier chain in every bridge branch the number of rectifiers will, as previously mentioned, be about $2 \cdot n$ with the same number of feeding units so that according to the invention the number of rectifiers is only increased slightly, while the number of feeding units is almost halved. By shifting the phase position of said control pulses in relation to the A.C. voltages from the converter transformer 7 one or the other of the two rectifier chains 11, 12 will be active in the same way as it is able by a smaller phase shifting of the control pulses to switch the converter from rectifier to inverter operation.

In FIGURE 3 a D.C. transmission system is shown comprising three converter stations I, II, III connected in parallel between earth and a common transmission line L. The stations II and III are drawn schematically as double reverse-parallel connected converters, while the station I has been drawn in more detail with a converter transformer and a bridge connection comprising double reverse-parallel connected rectifier branches. According to the invention power reversing in a station is carried out simply by transferring between the two sets of reverse-parallel connected rectifier connections by shifting the phase position of the control pulses as mentioned above. The transmission line L can therefore keep constant, for example positive polarity without requiring any switching devices in the main circuits for power reversing of the converter stations.

I claim:

1. Static converter for high voltage, comprising a converter transformer and a rectifier bridge and having an A.C. side and a D.C. side; one of said sides comprising an input side for the converter and the other side forming an output side, said rectifier bridge comprising a number of rectifier branches, said number of rectifier branches corresponding to the number of pulses of said static converter; each rectifier branch comprising a number of controlled metal rectifiers; said controlled metal rectifiers of a rectifier branch divided into two groups; said metal rectifiers of each group connected in series with each other; said two groups of rectifiers in a branch being reverse parallel connected to each other.

2. Static converter as claimed in claim 1; a voltage divider for each rectifier branch; said voltage divider comprising series connected capacitive elements; said voltage divider connected in parallel to said two reverse parallel connected groups of metal rectifiers; and traverse connections between said voltage divider and said two parallel connected groups of series connected metal rectifiers at equipotential points of said parallel connected groups and said voltage divider.

3. Static converter as claimed in claim 2; a control device for said metal rectifiers generating control pulses for the metal rectifiers; transmission units for transmission of said control pulses to said metal rectifiers; the cathodes of said metal rectifiers of said two groups being connected in pairs through said transverse connections; each pair of rectifiers having their cathodes interconnected being provided with a common transmission unit for transmission of control pulses thereto.

4. A high voltage direct current power transmission system comprising a number of converter stations; said converter stations provided with static converters as claimed in claim 3; a D.C. transmission line connecting said converter stations; each converter station including means for rectifier as well as inverter operation; one of said reverse parallel connected rectifier groups within each rectifier branch of the station being intended for rectifier operation, the other for inverter operation.

References Cited

UNITED STATES PATENTS

| | | | |
|---|---|---|---|
| 3,158,799 | 11/1964 | Kelly et al. | 321—27 |
| 3,180,974 | 4/1965 | Darling | 323—22 XR |
| 3,195,038 | 7/1965 | Fry | 323—25 |
| 3,287,622 | 11/1966 | Eckenfelder et al. | 321—69 |
| 3,328,596 | 6/1967 | Germann et al. | 321—45 XR |

FOREIGN PATENTS 1,331,475   5/1963   France.

JOHN F. COUCH, *Primary Examiner.*

W. M. SHOOP, *Assistant Examiner.*